(12) United States Patent
Schenk et al.

(10) Patent No.: US 8,181,472 B2
(45) Date of Patent: May 22, 2012

(54) ELECTRONIC REFRIGERATION CONTROL SYSTEM

(75) Inventors: Dennis Schenk, Anderson, SC (US); Karl M. Truitt, Richmond, IN (US)

(73) Assignee: Electrolux Home Products, Inc., Charlotte, NC (US)

( * ) Notice: Subject to any disclaimer, the term of this patent is extended or adjusted under 35 U.S.C. 154(b) by 573 days.

(21) Appl. No.: 11/378,047

(22) Filed: Mar. 17, 2006

(65) Prior Publication Data

US 2007/0012054 A1    Jan. 18, 2007

Related U.S. Application Data

(60) Provisional application No. 60/662,678, filed on Mar. 17, 2005, provisional application No. 60/662,694, filed on Mar. 17, 2005.

(51) Int. Cl.
F25B 49/00    (2006.01)

(52) U.S. Cl. .......................... 62/228.4; 62/187

(58) Field of Classification Search ................. 62/228.4, 62/187

See application file for complete search history.

(56) References Cited

U.S. PATENT DOCUMENTS

| | | | |
|---|---|---|---|
| 3,299,650 A | 1/1967 | Hollingworth | |
| 3,729,952 A | 5/1973 | Macleod | |
| 3,735,602 A | 5/1973 | Ramsey | |
| 3,817,451 A | 6/1974 | Ramsey | |
| 4,646,534 A | 3/1987 | Russell | |
| 4,662,185 A | 5/1987 | Kobayashi et al. | |
| 4,718,247 A | 1/1988 | Kobayashi et al. | |
| 4,843,833 A | 7/1989 | Polkinghorne | |
| 5,255,530 A | 10/1993 | Janke | |
| 5,261,247 A | 11/1993 | Knezic et al. | |
| 5,282,723 A | 2/1994 | Bellomo | |
| 5,460,009 A * | 10/1995 | Wills et al. | 62/180 |
| 5,548,969 A | 8/1996 | Lee | |
| 5,711,159 A | 1/1998 | Whipple, III | |
| 5,836,814 A * | 11/1998 | Cunningham, Jr. | 454/234 |
| 6,101,826 A * | 8/2000 | Bessler | 62/187 |
| 6,112,535 A | 9/2000 | Hollenbeck | |
| 6,161,394 A | 12/2000 | Alsenz | |
| 6,205,800 B1 * | 3/2001 | Topper et al. | 62/156 |
| 6,216,478 B1 | 4/2001 | Kang | |
| 6,523,361 B2 | 2/2003 | Higashiyama | |
| 6,530,236 B2 | 3/2003 | Crane et al. | |
| 6,675,590 B2 | 1/2004 | Aarestrup | |
| 6,688,965 B1 * | 2/2004 | Crippen et al. | 454/184 |
| 6,691,524 B2 | 2/2004 | Brooke | |
| 6,701,739 B2 | 3/2004 | Morse | |
| 6,708,507 B1 * | 3/2004 | Sem et al. | 62/126 |
| 6,769,265 B1 * | 8/2004 | Davis et al. | 62/228.4 |
| 6,772,601 B1 | 8/2004 | Davis et al. | |
| 6,779,353 B2 * | 8/2004 | Hu et al. | 62/180 |
| 6,782,706 B2 | 8/2004 | Holmes et al. | |
| 6,817,195 B2 | 11/2004 | Rafalovich et al. | |
| 7,275,380 B2 * | 10/2007 | Durant et al. | 62/178 |
| 2004/0016254 A1 * | 1/2004 | Park | 62/229 |
| 2004/0079096 A1 * | 4/2004 | Itoh et al. | 62/223 |
| 2004/0093879 A1 * | 5/2004 | Street et al. | 62/151 |
| 2004/0256378 A1 * | 12/2004 | Shukla | 219/490 |

(Continued)

*Primary Examiner* — Jonathan Koagel

(74) *Attorney, Agent, or Firm* — Pearne & Gordon LLP

(57) ABSTRACT

An electronic microprocessor-based control system for a refrigerator is provided having refrigeration components including a compressor, a condenser, a condenser fan, an evaporator, a variable speed evaporator fan. Multiple temperature sensors are provided to communicate with the electronic microprocessor-based electronic control system. The electronic microprocessor-based control system controls the operation of both the refrigeration and non-refrigeration components based on information provided by the multiple temperature sensors.

11 Claims, 13 Drawing Sheets

U.S. PATENT DOCUMENTS

| | | |
|---|---|---|
| 2005/0011205 A1 | 1/2005 | Holmes et al. |
| 2005/0022549 A1* | 2/2005 | Anderson et al. ............... 62/317 |
| 2005/0039472 A1* | 2/2005 | Cushman et al. ............... 62/187 |
| 2005/0144962 A1* | 7/2005 | Bair et al. ....................... 62/155 |

* cited by examiner

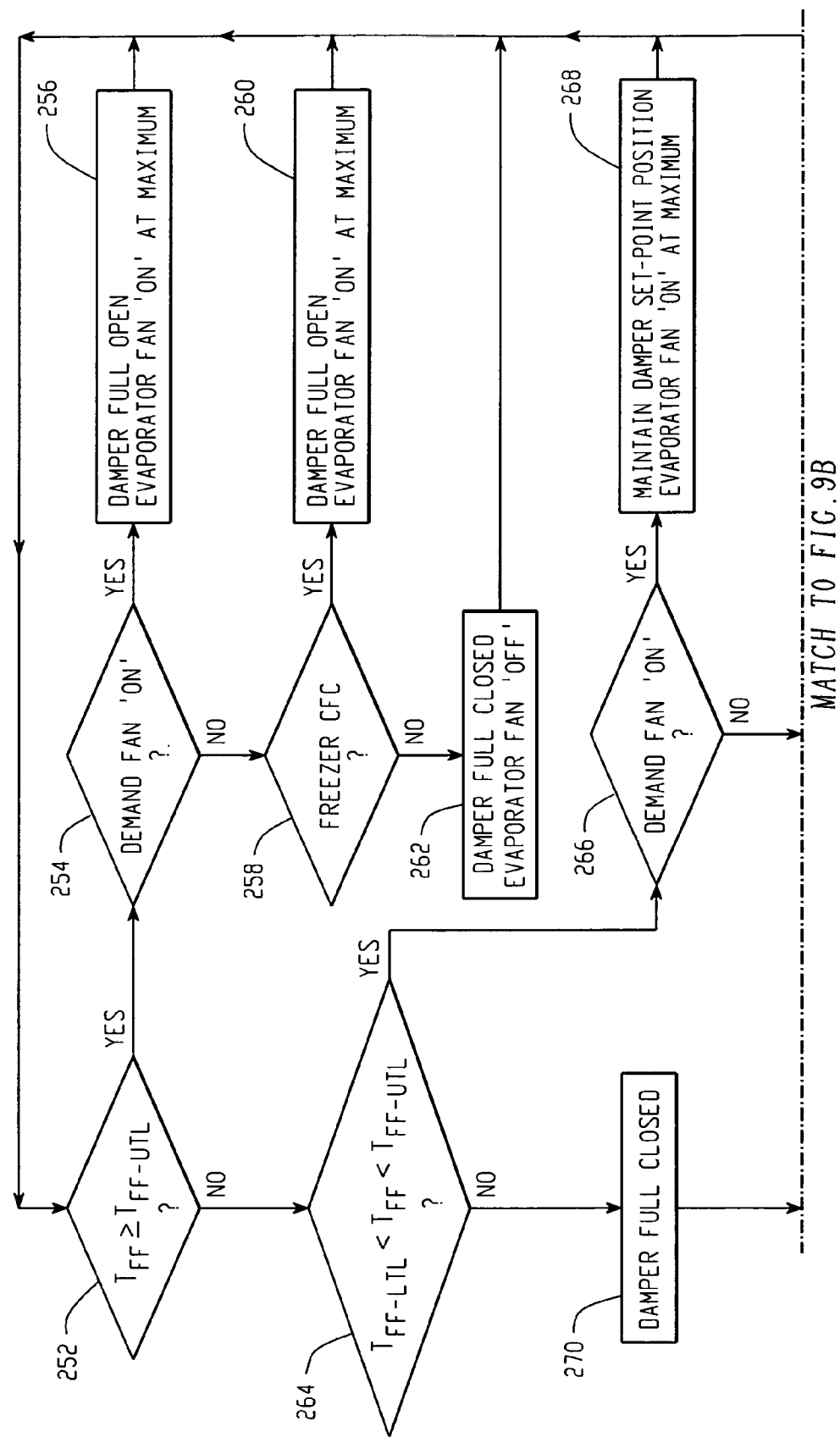

ELECTRONIC REFRIGERATION CONTROL SYSTEM

This application claims the benefit of U.S. Provisional Patent Application Nos. 60/662,678 and 60/662,694 both of which were filed on Mar. 17, 2005.

FIELD OF THE INVENTION

The present invention relates to a refrigeration appliance having a freezer compartment and a fresh-food compartment and more specifically to a refrigerator having a variable speed compressor and an electronic refrigeration control system for controlling the variable speed compressor.

BACKGROUND OF THE INVENTION

A typical refrigerator includes a freezer compartment that operates at a temperature below freezing and a fresh-food compartment that operates at a temperature between ambient and freezing. Typically, a damper or baffle is provided to control air flow between the freezer compartment and the fresh-food compartment. Conventional refrigerators include a refrigeration system having refrigeration components comprising a compressor, a condenser coil, a condenser fan, an evaporator, an evaporator fan and multiple single speed fans to direct the cool air throughout the freezer and fresh-food compartments. In addition, temperature sensors are provided inside the refrigerator to measure the temperature inside the freezer and fresh-food compartments. Conventional refrigerators also include an electronic control system to control non-refrigeration components, such as a user interface, lights, alarms, etc. but use conventional and less efficient timer-based methods to control the refrigeration components, such as the compressor, condenser, evaporator, etc. Thus, what is required is an electronic control system that controls all the components of the refrigerator including the refrigeration components to maximize efficiency.

In conventional refrigerators the refrigeration components operated at a single speed. Thus, when cooling was required, such as when a compartment door was opened, these systems were forced to operate a maximum level to cool the compartment down to its predetermined temperature. These single speed systems proved to be inefficient. In order to improve the efficiency of the refrigeration system variable speed systems having variable speed components were implemented where the speed of one or more of the refrigeration components is varied depending on the variation in temperature. These systems use several factors to vary the speed of the components, such as temperature of the freezer and fresh-food compartments, the ambient temperature, upper and lower temperature limits, etc. None of these systems, however, utilize all the factors to optimize the efficiency of the refrigerator system. Thus, what is required is a refrigerator system that utilizes multiple variables to vary the speed of the variable speed components to achieve optimum efficiency.

The present invention relates to a controller for achieving optimum efficiency by controlling various aspects of the refrigeration system. Similar refrigerators of this type are shown and described in the following U.S. patents, which are incorporated herein by reference: U.S. Pat. No. 5,201,888 to Beach, Jr. et al., U.S. Pat. Nos. 6,523,358, 6,694,755, and 6,837,060 to Collins, and U.S. Pat. No. 6,497,108 to Collins et al.

BRIEF SUMMARY OF THE INVENTION

In accordance with one aspect, an electronic microprocessor-based control system for a refrigerator having a first compartment, a second compartment, refrigeration components including a variable speed compressor and non-refrigeration components is provided comprising a main control board, wherein the main control board operates the compressor based on a first compartment temperature, a second compartment temperature and an ambient temperature and wherein the main control board adjusts operation of the compressor based on a first compartment set-point temperature, a first compartment temperature, a first compartment upper temperature limit and a first compartment lower temperature limit.

In accordance with another aspect, a refrigerator is provided comprising a freezer compartment, a fresh-food compartment, non-refrigeration components, a refrigeration system having refrigeration components including a compressor, a condenser, a condenser fan, an evaporator and an evaporator fan and an electronic control system, wherein the electronic control system controls the operation of the refrigeration components and non-refrigeration components based on a freezer compartment temperature, a fresh-food compartment temperature and an ambient temperature.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIGS. 9A and 9B are a flowchart illustrating the operation of the refrigerator system with a standard compressor as controlled by the fresh-food compartment temperature.

DETAILED DESCRIPTION OF THE INVENTION

Figure 1:
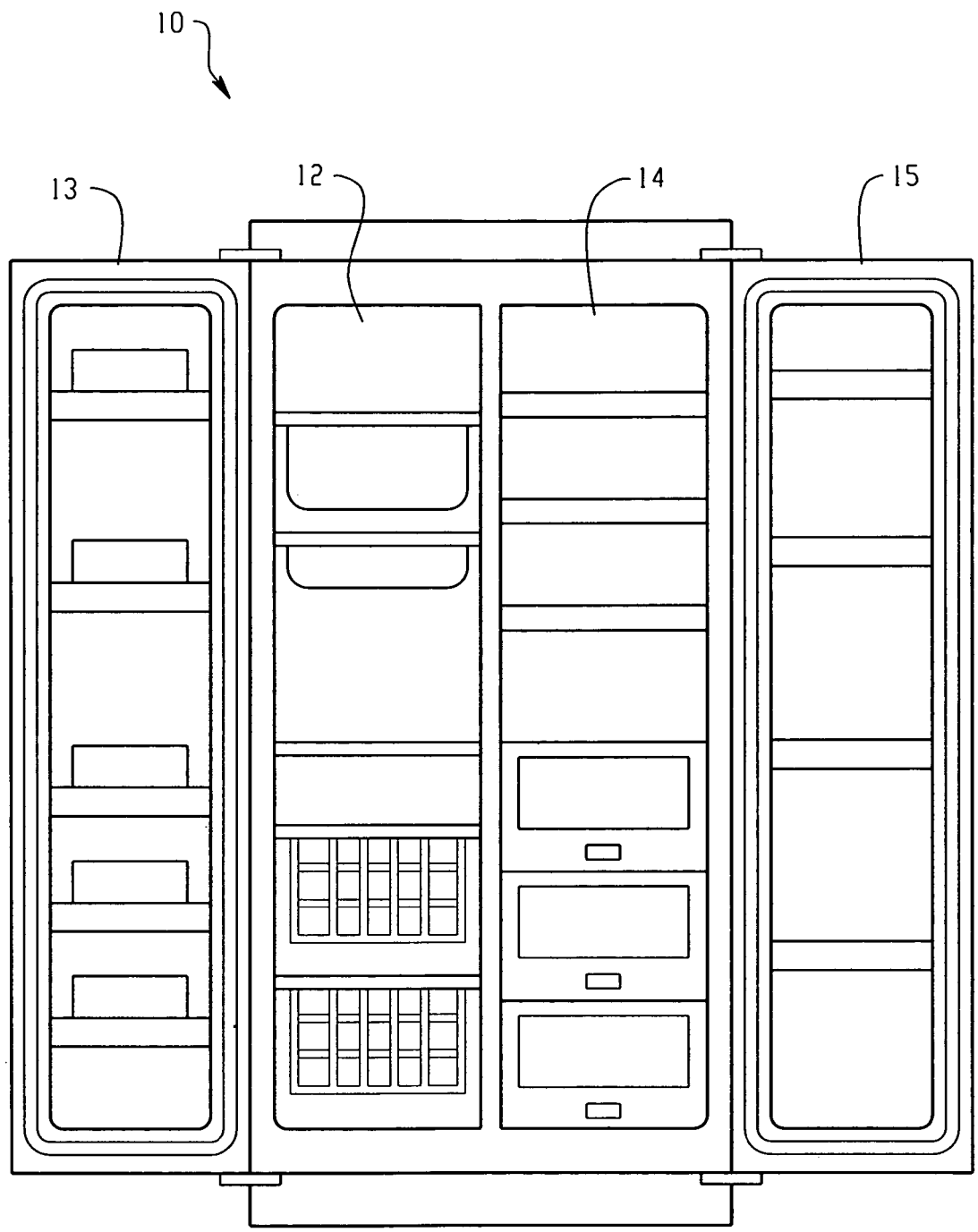
FIG. 1 is front view of a typical refrigerator.
Figure 2:
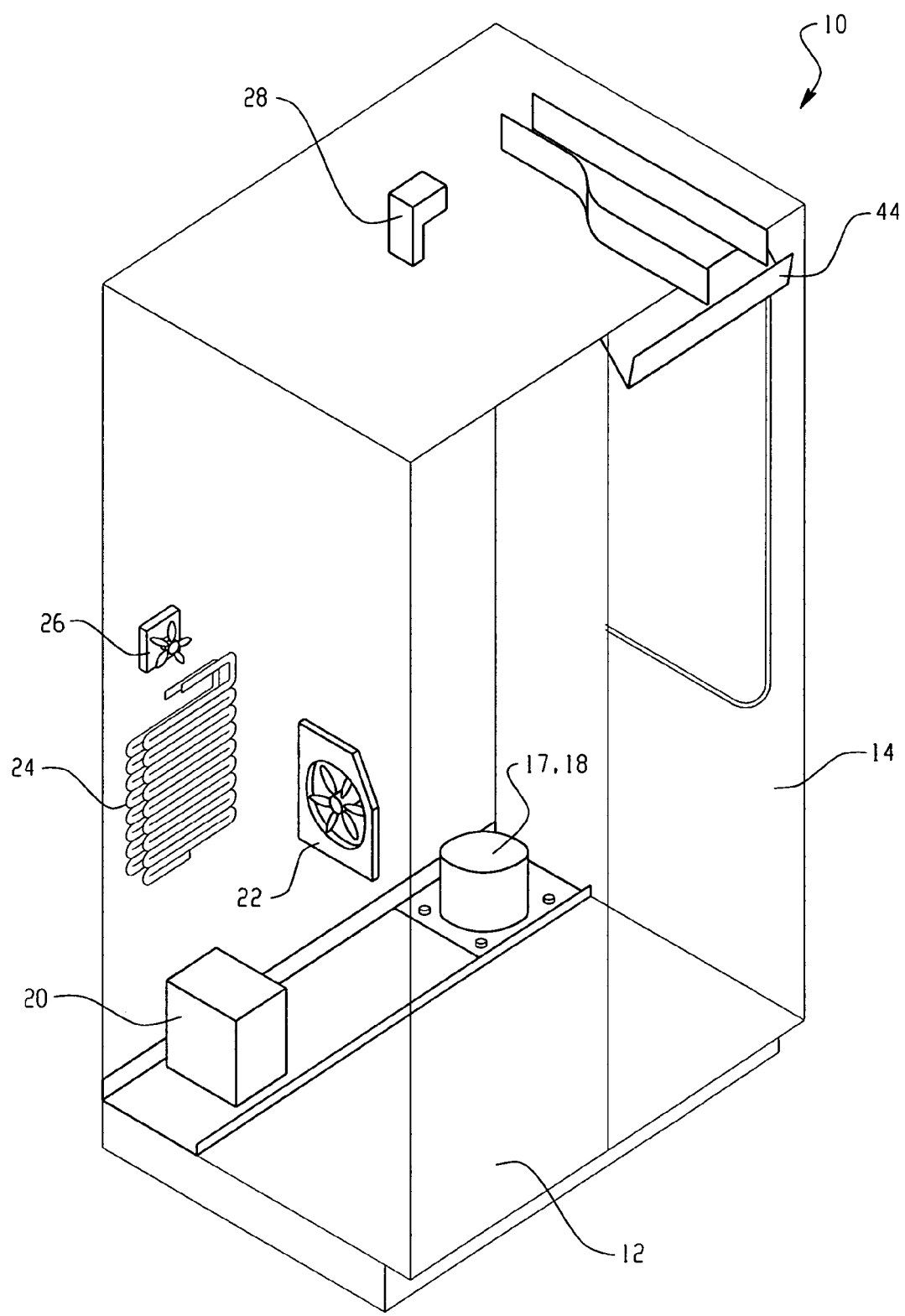
FIG. 2 is a perspective view of the refrigerator showing the location of the refrigerator system.

Referring now to the drawings, FIGS. 1 and 2 show a typical refrigerator 10 having a freezer compartment 12, a freezer compartment door 13, a fresh-food compartment 14 and a fresh-food compartment door 15. A channel connects the freezer 12 and fresh-food 14 compartments to allow air flow between the two compartments 12, 14. A damper 28 is provided in the channel to regulate the air flow between the freezer 12 and fresh-food 14 compartments. The refrigerator 10 includes a refrigeration system having refrigeration components comprising either a standard compressor 17 or a variable speed compressor 18, a condenser 20, a condenser fan 22, an evaporator 24 and a variable speed evaporator fan 26. The variable speed compressor 18 operates at an optimum speed $\omega_C$ based on multiple variables, such as sensed temperature, temperature set points and temperature limits as will be described in further detail below.

The condenser fan 22 provides circulation through the condenser coil to quickly dissipate heat to thereby improve the performance and efficiency of the compressor 17, 18. The condenser fan 22 is driven by a motor 23 and can either be connected such that the it will run when the compressor 17, 18 is running or in the alternative the condenser fan 22 can be independently controlled by the refrigerator control system.

The variable speed evaporator fan 26 operates at multiple speeds and typically has a minimum speed, for example 2000 RPM, and a maximum speed, for example 2700 RPM. The variable speed evaporator fan 26 is driven by a motor 27 that may have a tachometer. Thus, the speed of the variable speed evaporator fan 26 can be regulated by using a closed loop control. Further, the speed of the variable speed evaporator fan 26 can be set as a function of the position of the damper 28. For example, the variable speed evaporator fan 26 may operate at the minimum or the maximum speed when the damper 28 is opened to a position either below or above a predetermined threshold respectively. When the control system 40 senses that the evaporator fan 26 is either not rotating properly or not rotating at all the control system will enter a fail safe mode. In fail safe mode the damper 28, if open, will close. Then the evaporator fan 26 will be periodically restarted until the evaporator fan 26 restarts at which time the damper 28 will reopen.

As mentioned above, opening and closing of the damper 28 controls the air flow between the freezer 12 and fresh-food compartments 14. Opening and closing of the damper 28 can be controlled by any type of motor 29 known in the art, such as a stepper motor. The position of the damper 28 can be set to any position between the fully closed position and the fully open position. For example, when the fresh-food compartment temperature $T_{FF}$ is above a predetermined fresh-food compartment upper temperature limit $T_{FF-UTL}$ the damper 28 can be set to the full open position to provide the fastest cooling time to the fresh food compartment 14. In contrast, the damper can be set to the full closed position when the fresh-food compartment temperature $T_{FF}$ is below a predetermined fresh-food lower temperature limit $T_{FF-LTL}$ to provide a slower cooling time to the fresh-food compartment 14. Further, if the fresh-food compartment temperature $T_{FF}$ is between the fresh-food compartment upper $T_{FF-UTL}$ and lower $T_{FF-LTL}$ temperature limits the damper 28 can be set to a position between the full open and full closed position to thereby maintain the fresh-food compartment 14 at a constant temperature. Further operation of the damper 28 in conjunction with cooling the fresh food compartment 14 is explained further below.

Figure 3:
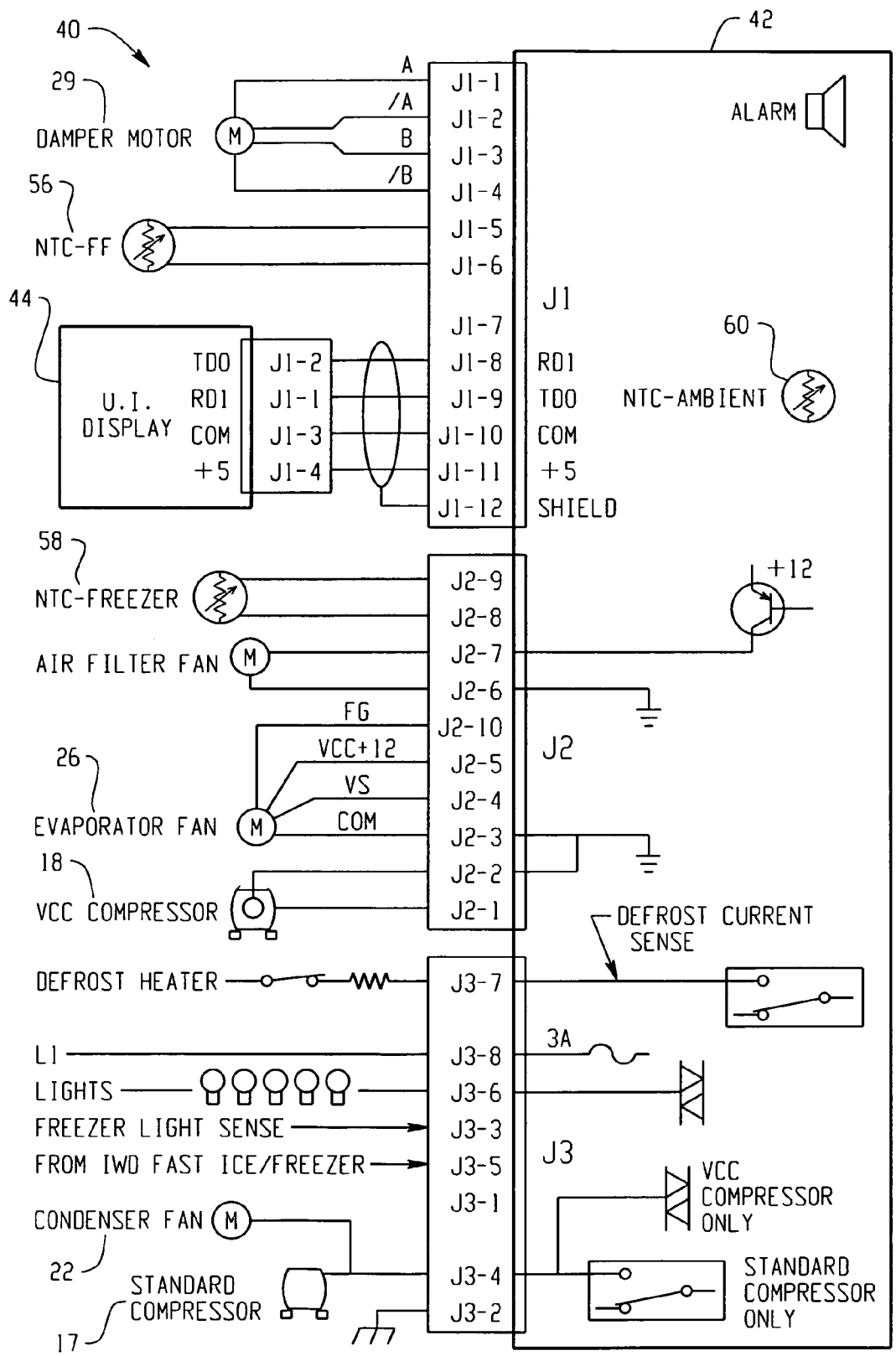
FIG. 3 is a schematic of the electronic control system.
Figure 4A:
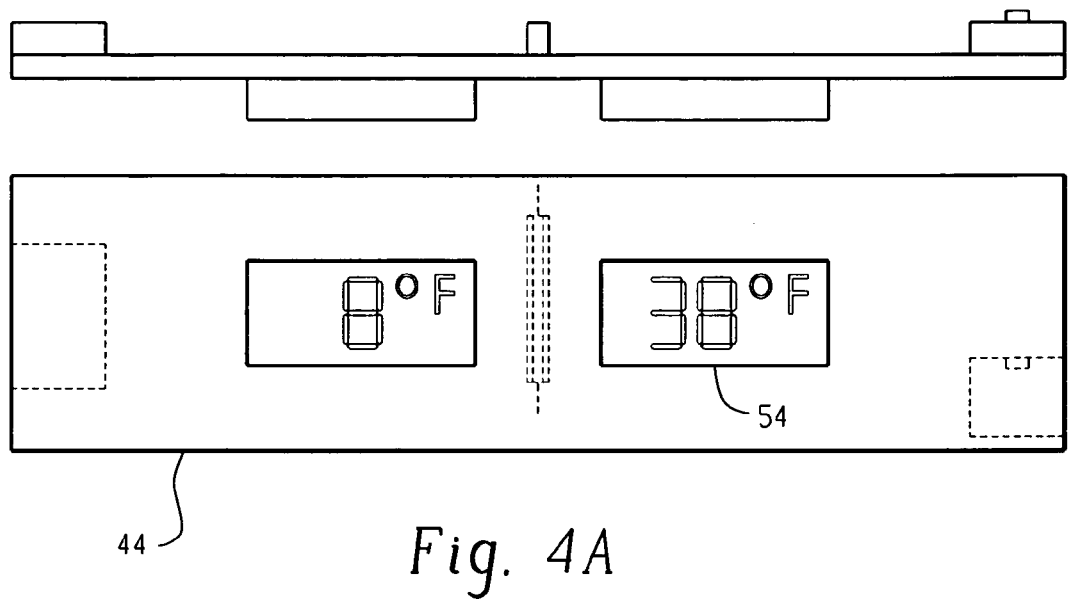
FIGS. 4A and 4B are schematics of the dual user interface display and the single user interface display respectively.
Figure 4B:
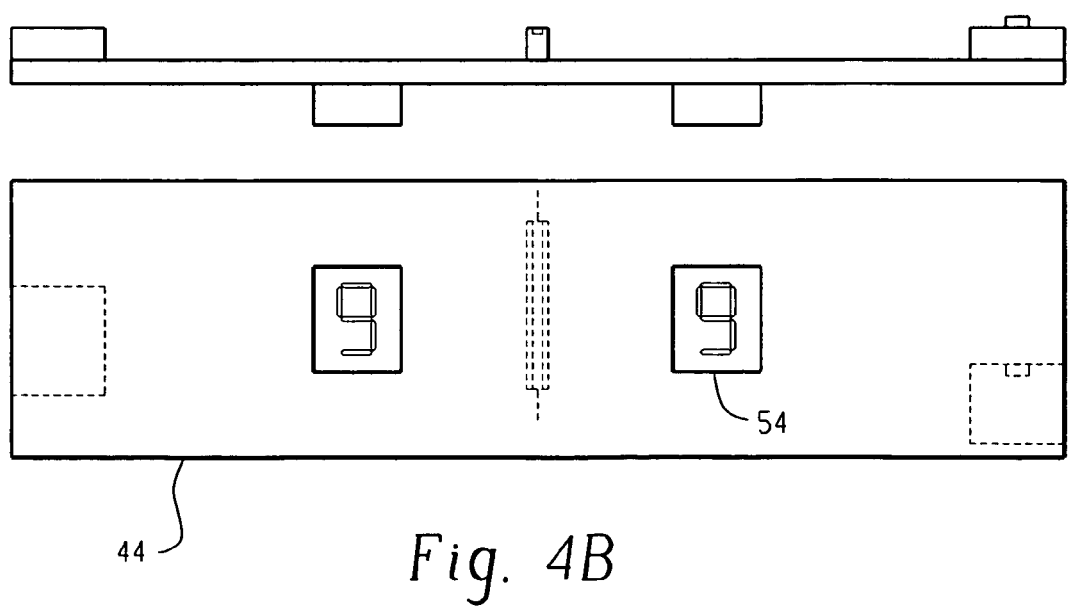
Figure 5A:
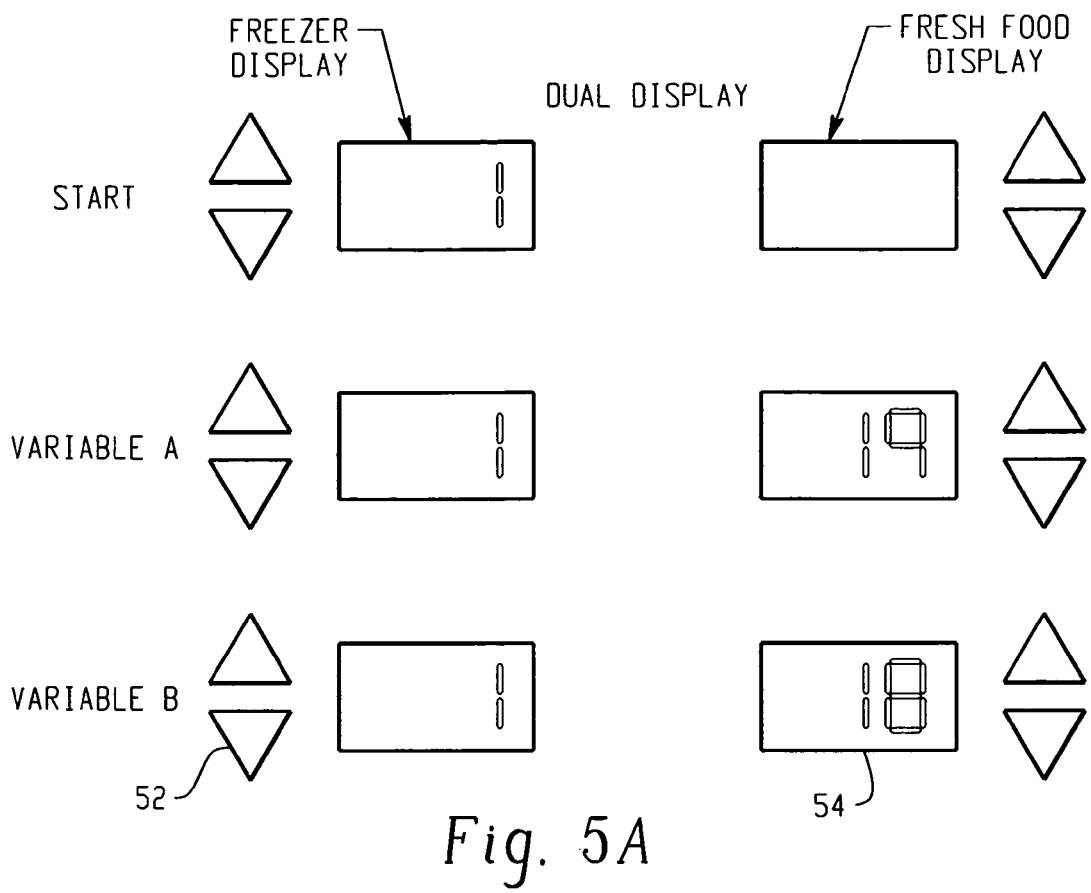
FIGS. 5A and 5B are schematics of the dual user interface display and the single user interface display respectively.
Figure 5B:
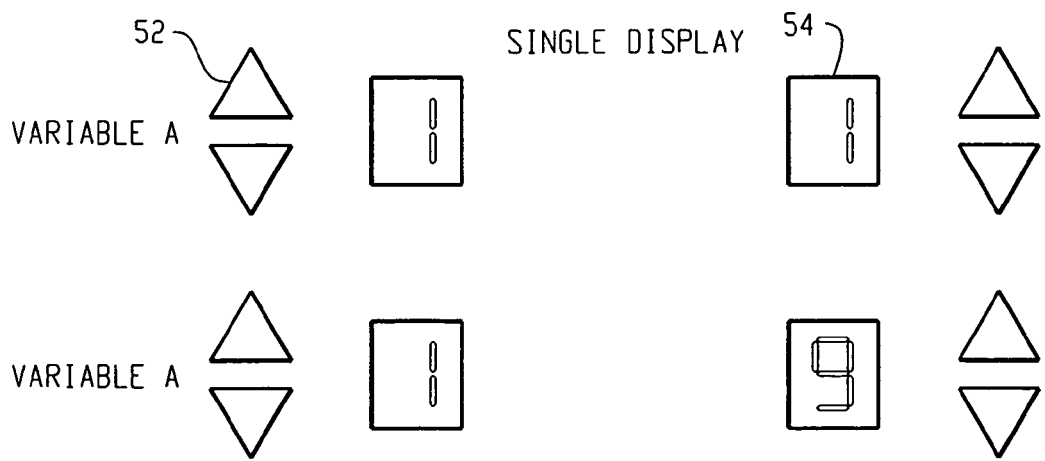

Referring to FIGS. 3-5, the refrigerator 10 further includes an electronic microprocessor-based control system 40 for controlling the refrigeration components, such as the compressor 17, 18, the condenser 20 and condenser fan 22, the evaporator 24 and evaporator fan 26 as well as non-refrigeration components, such as a user interface, indicator lights, alarms, etc. The control system 40 is comprised of a main control board or controller 42 and a user interface/display board 44.

The main control board 42 supplies DC power to the components in the refrigerator 10, such as the user interface control board 44, the compressor 17, 18, the condenser fan motor 23, the evaporator fan motor 27, the damper motor 29, microprocessors, for implementing control logic or algorithms, and other related circuitry for lights, temperature sensing, alarms, an air filter and air filter fan, etc. as shown in FIG. 3. The control system 40 monitors and may control an ice/water dispenser and a fast ice/fast freeze feature of the refrigerator 10. The fast ice/fast freeze feature provides the operator with an override function where the operator can override the control system 40 and operate the compressor 17, 18 and the evaporator fan 26. More specifically, the fast ice feature allows the operator to override the control system 40 and operate the compressor 17, 18 and the evaporator fan 26 even if there is no need to cool the freezer 12 or fresh-food 14 compartment to make ice more quickly. Specific operation of the compressor 17, 18 and evaporator fan depend on if the compressor is a standard compressor 17 or a variable speed compressor 18, as described further below and shown in FIGS. 6-9. The fast freeze feature allows the operator to control the compressor 17, 18 and evaporator fan 26 by lowering a freezer compartment set-point temperature $T_{F-SP}$ by a predetermined amount, such as 6° F., to thereby cool the freezer compartment 12 more quickly, as described further below and shown in FIGS. 6-9. When the temperature of the freezer compartment 12 reaches the new freezer compartment set-point temperature $T_{F-SP}$ the set-point temperature will reset to the original set-point temperature.

The user interface/display board 44 communicates with the main control board 42 and includes a communication means to allow the user to communicate with the main control board 42. The communication means may be in the form of multiple control switches of any type known in the art, such as membrane switches 52 as shown in FIG. 5. The membrane switches 52 control multiple functions in the refrigerator, such as the freezer and fresh-food temperatures, an alarm an air filter, etc. Referring to FIGS. 4A and 4B, the user interface/display board 44 further includes a display portion 54 for conveying information to the user. The display portion 54 may be any type of display known in the art, such as a 7-segment display. The display portion 54 shown in FIG. 4A is a two-digit, 7-segment display that displays temperature either in degrees Fahrenheit or Centigrade. The display portion shown in FIG. 4B is a single-digit, 7-segment display that displays a temperature setting from 1 to 9. In the event that communication is lost between the main control board 42 and the user interface/display board 44 the control system 40 will enter the fail safe mode. In the fail safe mode the control system 40 will maintain the last freezer and fresh-food compartment set-point temperatures.

The control system 40 further controls multiple alarm functions. These alarm functions include a door ajar alarm, a high temperature alarm and a power failure alarm. The door ajar alarm sounds and a light indicator turns on or flashes when the freezer door 13 or the fresh food door 14 are open for a predetermined period of time, such as for example 5 minutes. The alarm will reset when either the door is closed or an alarm reset key is activated. The high temperature alarm will sound and the light indicator will turn on or flash when either the freezer compartment temperature $T_F$ or the fresh-food compartment temperature $T_{FF}$ are above a predetermined temperature, for example 45° F. for a predetermined period of time, for example 1 hour. The power failure alarm will turn on the light indicator when there is a power interruption for a predetermined period of time. Enabling each alarm is automatic and are started when a power-on reset button is activated. Enabling, however, is delayed until the freezer compartment temperature $T_F$ equals the freezer compartment set-point temperature $T_{F-SP}$ and the fresh-food compartment temperature $T_{FF}$ equals the fresh-food compartment set-point temperature $T_{FF-SP}$. The enable delay may have a maximum time period, such as for example 180 minutes. Once the alarm is enabled an "Alarm On" indicator will turn on indicating that the alarm is active. The alarm can be disabled by activating an alarm disable function, such as for example holding the alarm reset key for 3 seconds.

As mentioned above the variable speed compressor 18 operates at an optimum speed ω based on multiple variables, such as sensed temperature, temperature set points and temperature limits. The current speed or the calculated speed $\omega_{calc}$ of the variable speed compressor 18 is a function of at least one of the following parameters: 1) the freezer set-point compartment temperature $T_{F\text{-}SP}$, 2) a fresh-food compartment set-point temperature $T_{FF\text{-}SP}$ and 3) the ambient temperature $T_A$. The calculated speed $\omega_{calc}$ of the variable speed compressor 18 is determined using the following polynomial equation:

$$(T_{F\text{-}SP})*(K1)+(T_{F\text{-}SP})^{2}*(K2)+(T_{FF\text{-}SP})*(K3)+ \\ (T_{FF\text{-}SP})^{2}*(K4)+(T_A)*(K5)+(T_A)^{2}*(K6)+(K7) \quad (1)$$

where K1-K7 are predetermined compressor speed variables. For example, in one embodiment K1=-105; K2=1.04; K3=10.97; K4=-0.34; K5=115; K6=-0.26 and K7=-6443. If the calculated speed $\omega_{calc}$ of the variable speed compressor 18 is less than a predetermined minimum speed $\omega_{min}$, then variable speed compressor 18 will operate at the minimum speed $\omega_{min}$. Further, if the calculated speed $\omega_{C\text{-}calc}$ of the variable speed compressor 18 is greater than a predetermined maximum speed $\omega_{max}$, then variable speed compressor 18 will operate at the maximum speed $\omega_{max}$. Once operational, adjusting the speed of the variable speed compressor 18 becomes a function of at least one of the following parameters: 1) the freezer compartment set-point temperature $T_{F\text{-}SP}$, 2) a freezer compartment temperature $T_F$, 3) a freezer compartment upper temperature limit $T_{F\text{-}UTL}$ and 4) a freezer compartment lower temperature limit $T_{F\text{-}LTL}$. The adjusted speed $\omega_{adj}$ is determined by the following equation:

$$\omega_{calc}+\{T_F-(T_{F\text{-}UTL}+4+T_{F\text{-}SP})\}*K8 \quad (2)$$

where K8 is a predetermined compressor speed variable. For example, in one embodiment K8=200.

Figure 6A:
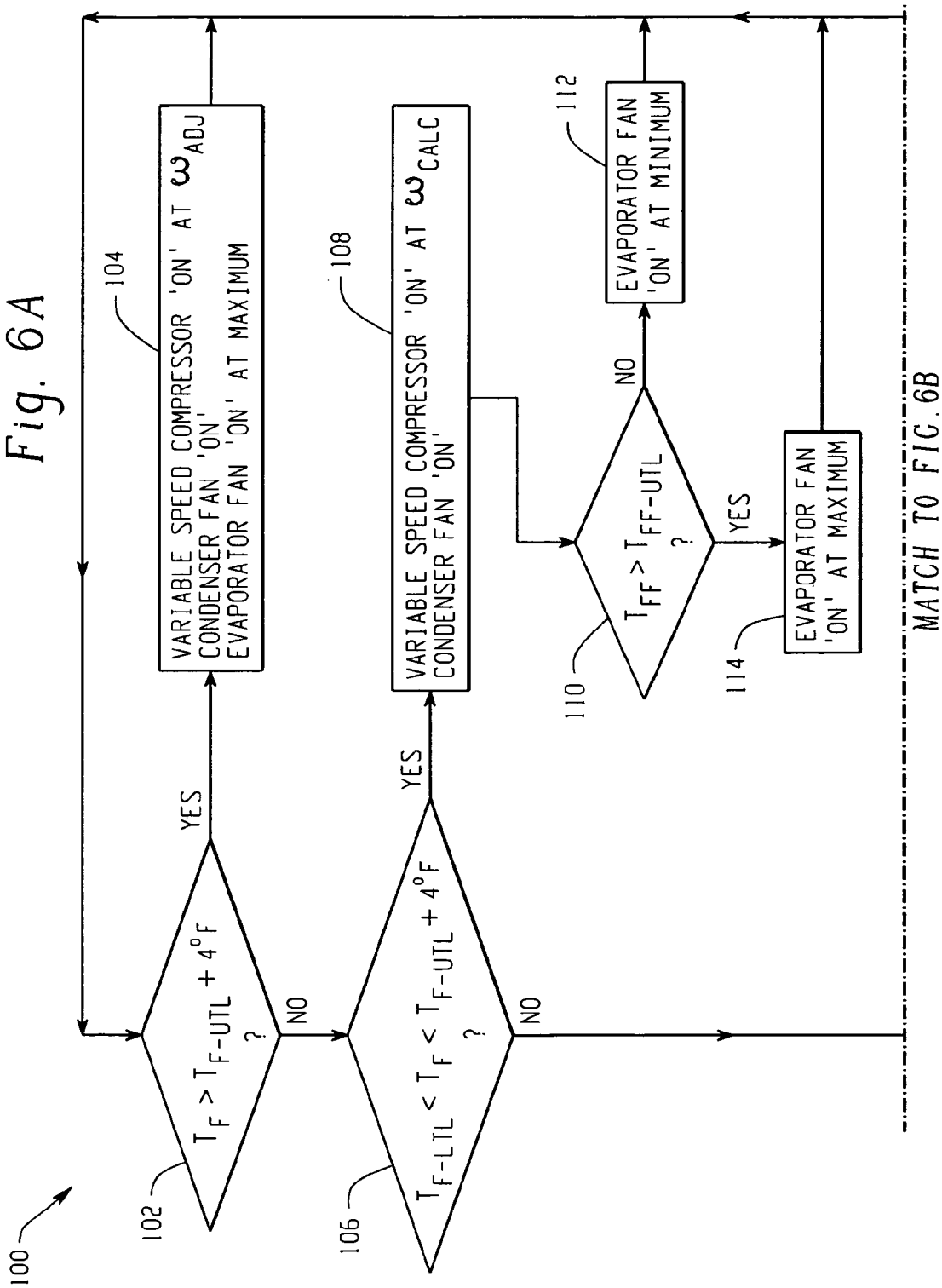
FIGS. 6A and 6B are a flowchart illustrating the operation of the refrigerator system with a variable speed compressor as controlled by the freezer compartment temperature.
Figure 6B:
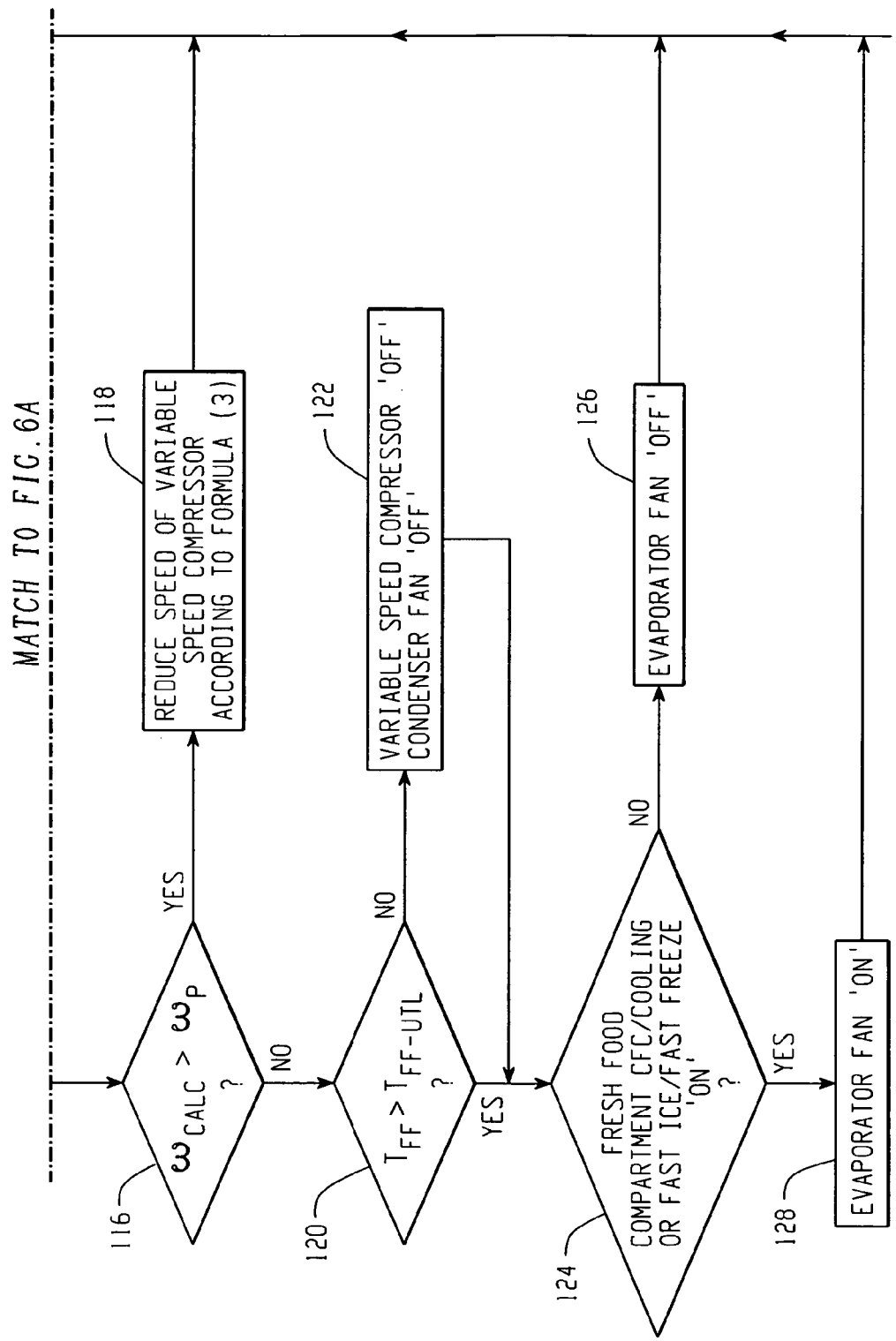

FIGS. 6A and 6B show an algorithm represented by a flowchart 100 that illustrates the operation of the refrigeration system utilizing the variable speed compressor 18 based on the freezer compartment temperature $T_F$. During operation of the refrigerator 10 the freezer compartment temperature $T_F$ is monitored to determine if the freezer compartment temperature $T_F$ is above, below or within the freezer compartment upper $T_{F\text{-}UTL}$ and lower $T_{F\text{-}LTL}$ temperature limits. The process begins at step 102 where the freezer compartment temperature $T_F$ is measured to determine if it is greater than the freezer compartment upper temperature limit $T_{F\text{-}UTL}$ plus 4° F. If YES, then the variable speed compressor 18 will operate at an adjusted speed $\omega_{adj}$ as defined by equation (2) above, as shown in step 104. In addition, the condenser fan 22 will turn ON and the evaporator fan 26 will operate at its maximum speed. If NO, then the process proceeds to step 106 where the freezer compartment temperature $T_F$ is measured to determine if it is greater than the freezer compartment lower temperature limit $T_{F\text{-}LTL}$ and less than the freezer compartment upper temperature limit $T_{F\text{-}UTL}$ plus 4° F. If YES, then at step 108 the variable speed compressor 18 will continue to operate at the calculated speed $\omega_{calc}$ and the condenser fan 22 will turn ON. Further, to determine the speed of the evaporator fan 26 under this condition the fresh-food compartment temperature $T_{FF}$ is measured to determine if it is greater than the fresh-food compartment upper temperature limit $T_{FF\text{-}UTL}$. If YES, then at step 114 the evaporator fan 22 will operate at its maximum speed. If NO, then at step 112 the evaporator fan will operate at its minimum speed. If the freezer compartment temperature $T_F$ is not within the freezer compartment lower $T_{F\text{-}LTL}$ and upper $T_{F\text{-}UTL}$ temperature limits the freezer compartment temperature $T_F$, therefore, must be less than the freezer lower compartment temperature limit $T_{F\text{-}LTL}$ and the process proceeds to step 116. At step 116 the speed of the variable speed compressor 18 is calculated $\omega_{calc}$ to determine if it is greater than a predetermined compressor speed $\omega_p$. If YES, then the speed of the variable speed compressor 18 will be reduced according to the following equation:

$$\omega_{calc}+K11*[T_F-(T_{F\text{-}SP}-5)] \quad (3)$$

where K11 is a compressor speed variable. For example, in one embodiment K11=100. If NO, the process proceeds to step 120 to determine if the fresh-food compartment temperature $T_{FF}$ is greater than the fresh food compartment upper temperature limit $T_{FF\text{-}UTL}$. If NO, then at step 122 the variable speed compressor 18 and the condenser fan 26 will turn OFF. To determine the speed of the evaporator fan 26 under this condition or if the decision at step 124 is NO the process proceeds to step 124 to determine if there is a call for cooling (CFC) for the fresh food compartment 14 or if the fresh food compartment 14 is cooling or if the fast ice or fast freeze feature is activated. If NO, then at step 126 the evaporator fan 26 will turn OFF. If YES, then at step 128 the evaporator fan 26 will turn ON. The algorithm continuously repeats to maintain the freezer compartment temperature $T_F$ and the fresh-food compartment temperature $T_{FF}$ at proper levels.

Figure 7A:
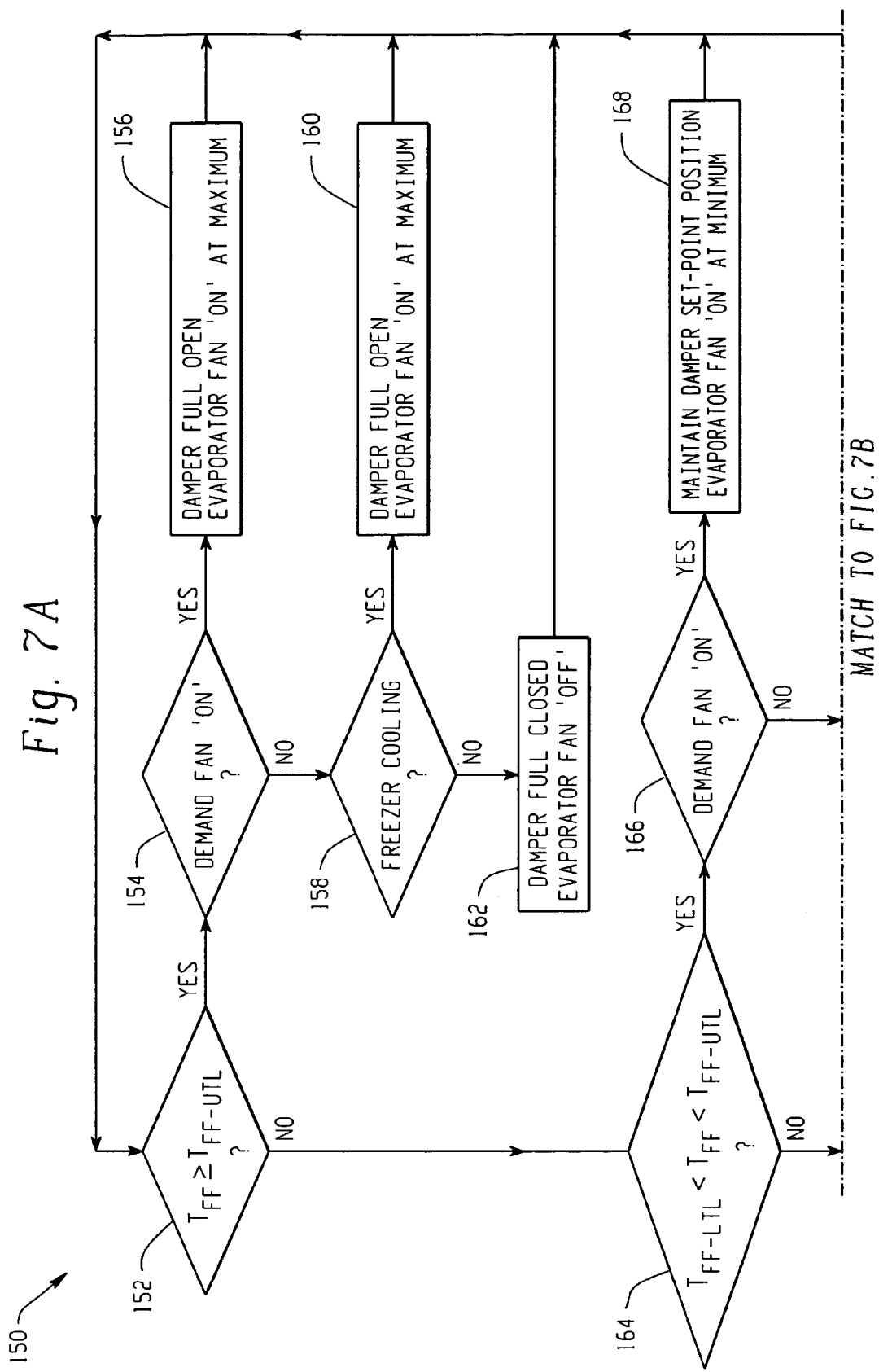
FIGS. 7A and 7B are a flowchart illustrating the operation of the refrigerator system with a variable speed compressor as controlled by the fresh-food compartment temperature.
Figure 7B:
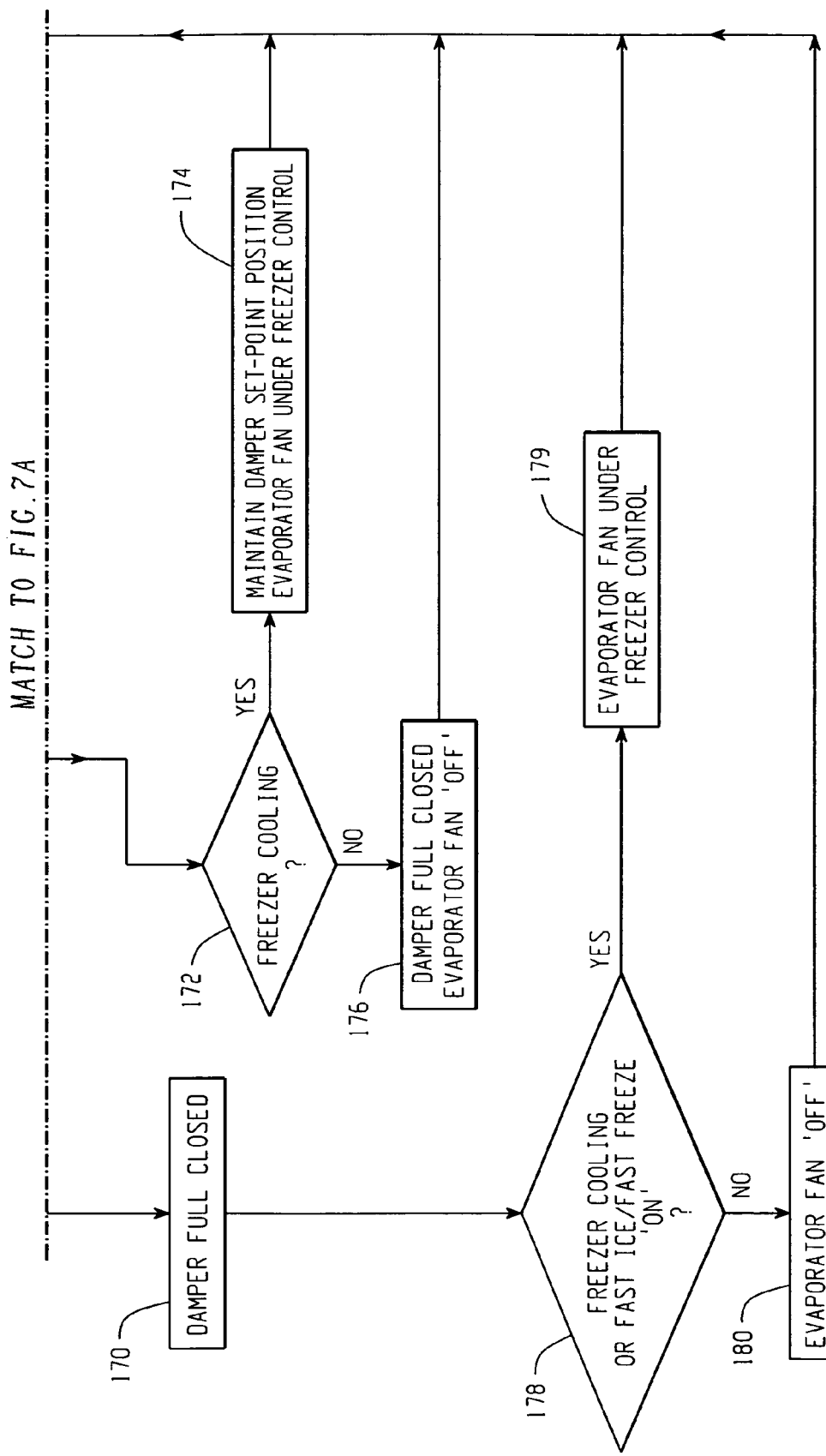

FIGS. 7A and 7B show an additional algorithm, with the variable speed compressor 18 system, represented by a flowchart 150 where the operation of the damper 28 and the evaporator fan 26 are a function of the fresh-food compartment temperature $T_{FF}$. The algorithm in FIGS. 7A and 7B is similar to the algorithm shown in FIGS. 9A and 9B, which incorporates a standard compressor 17 system. Thus, the process illustrated in FIGS. 9A and 9B will not be described. The process begins at step 152 where the fresh-food compartment temperature $T_{FF}$ is measured to determine if it is greater than or equal to the fresh-food compartment upper temperature limit $T_{FF\text{-}UTL}$. If YES, then at step 154 the process determines if the control system 40 has requested a demand that the evaporator fan 26 be activated, known as a DEMAND FAN ON. A DEMAND FAN ON request is made when the door 15 to the fresh-food compartment 14 is opened during the last or the current variable speed compressor 18 cycle or the fresh-food compartment temperature $T_F$ is greater than the fresh-food compartment upper temperature limit $T_{FF\text{-}UTL}$ or the ambient temperature $T_A$ is greater than a predetermined value, such as for example 80° F. If there is a request for a DEMAND FAN ON then at step 156 the damper 28 will be in a full open position and the evaporator fan 26 will turn ON at maximum speed. If there is not a request for a DEMAND FAN ON then at step 158 the process determines if the freezer compartment 12 is cooling. If YES, then the damper 28 will be in a full open position and the evaporator fan 26 will turn ON at maximum speed. IF NO, then at step 162 the damper 28 will be in a full closed position and the evaporator fan 26 will turn OFF. If at step 152 the fresh-food compartment temperature $T_{FF}$ is not greater than or equal to the fresh-food compartment upper temperature limit $T_{FF\text{-}UTL}$ the process proceeds to step 164 where the fresh-food compartment temperature $T_{FF}$ is measured to determine if it is within the fresh-food compartment lower $T_{FF\text{-}LTL}$ and upper $T_{FF\text{-}UTL}$ temperature limits. If YES, then at step 166 the process determines if there is a DEMAND FAN ON request. If YES, then at step 168 the damper 28 will maintain its set-point position and the evaporator fan 26 will turn ON at minimum speed. If there is not a request for a DEMAND FAN ON then at step 172 the process determines if the freezer compartment 12 is cooling. If YES, then at step 174 the damper 28 will maintain its set-point position and control of the evaporator fan 26 will be a function of the freezer compartment temperature $T_F$ as described above. IF NO, then at step 176 the damper 28 will be in a full closed position and the evaporator fan 26 will turn OFF. If the fresh-food compartment temperature $T_{FF}$ is not within the fresh-food compartment lower $T_{FF-LTL}$ and upper $T_{FF-UTL}$ temperature limits at step 164 the process proceeds to step 170 where the damper 28 is in a full closed position. Then at step 178 the process determines if the freezer compartment 12 is cooling or if the fast ice/fast freeze feature is ON. If YES, then at step 179 the evaporator fan 26 will be a function of the freezer compartment temperature $T_F$ as described above. If NO, then at step 180 the evaporator fan 25 will turn OFF. The algorithm continuously repeats to maintain the fresh food compartment temperature $T_{FF}$ at a proper level.

Figure 8A:
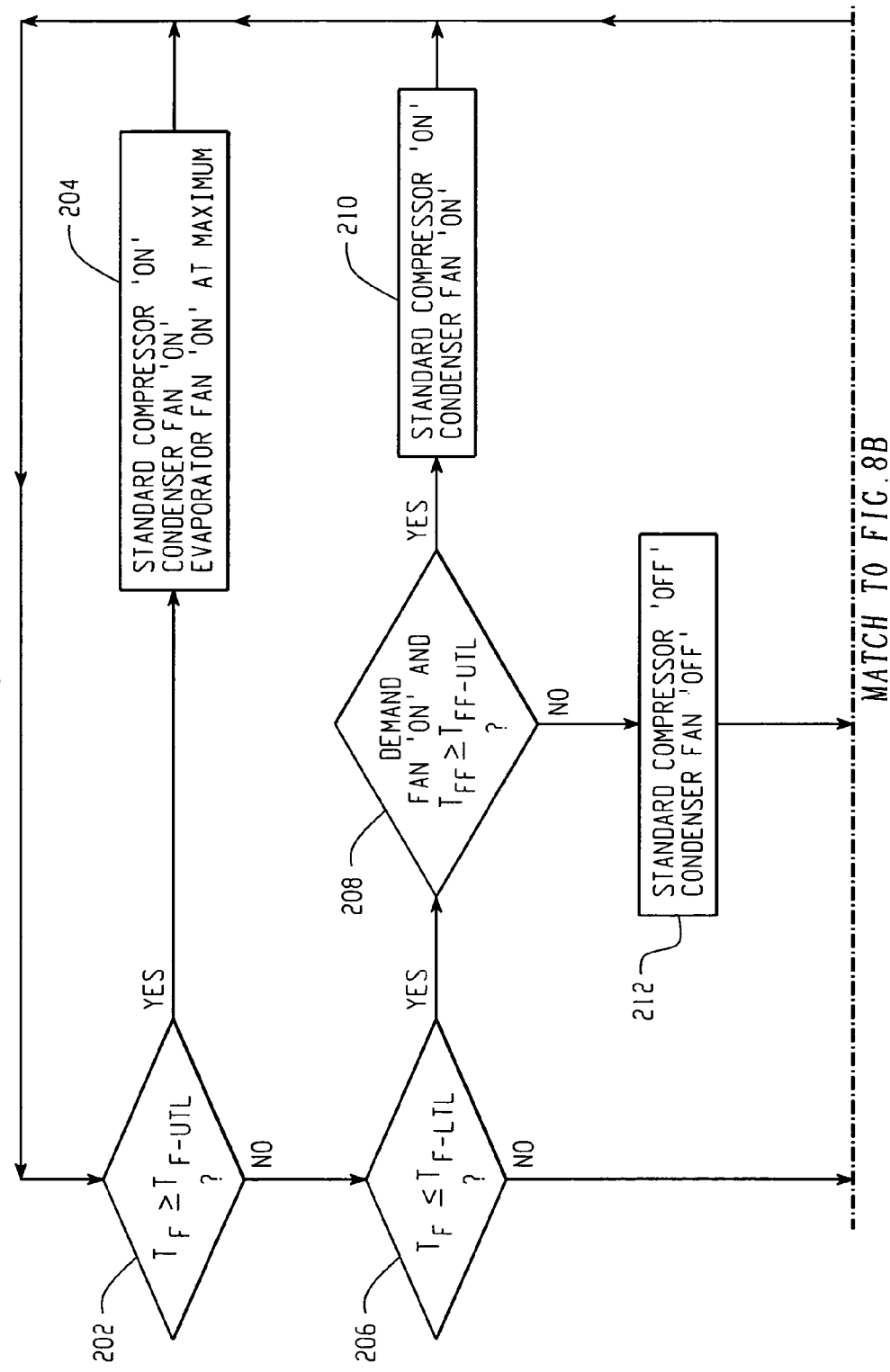
FIGS. 8A and 8B are a flowchart illustrating the operation of the refrigerator system with a standard compressor as controlled by the freezer compartment temperature.
Figure 8B:
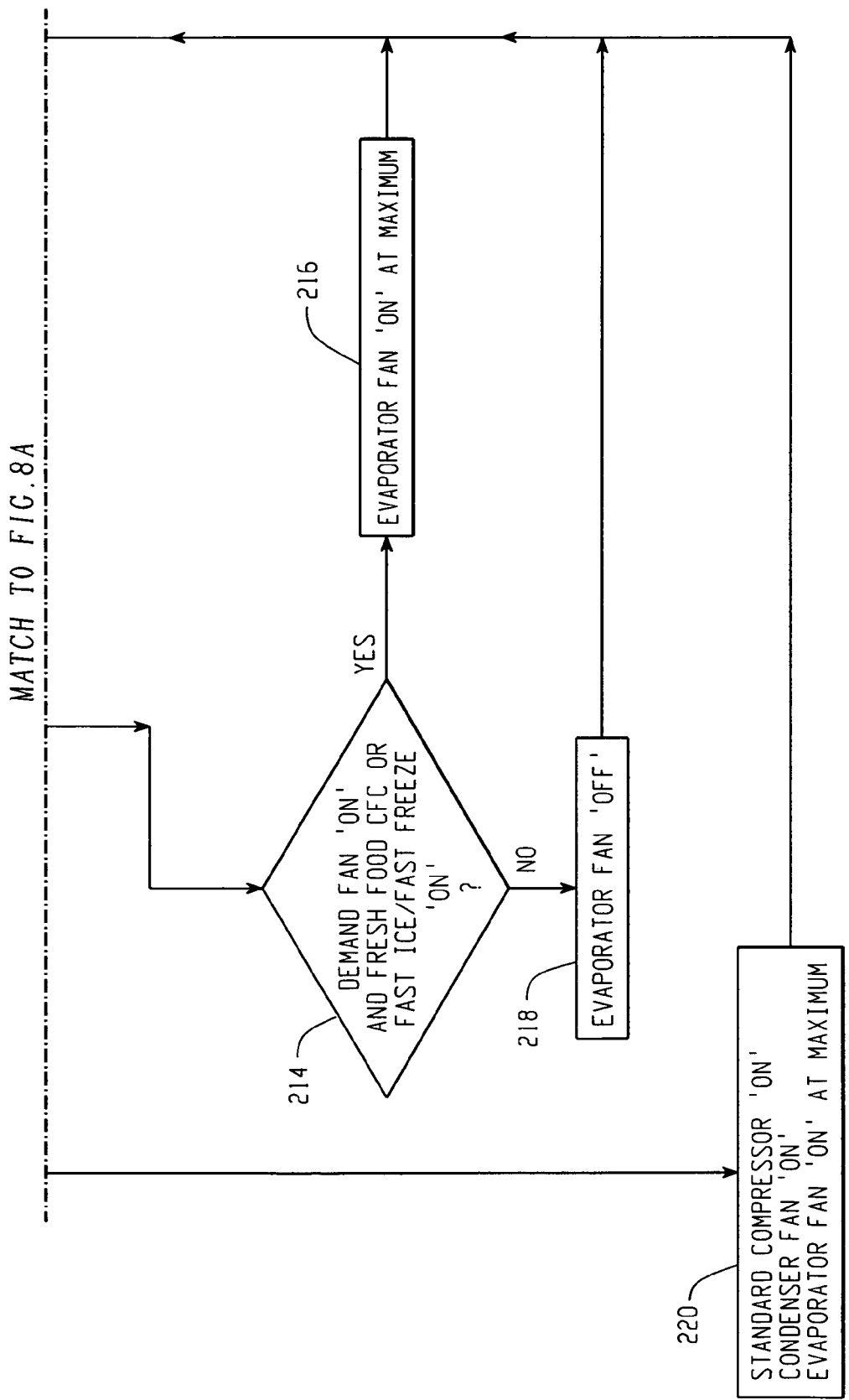
Figure 9B:
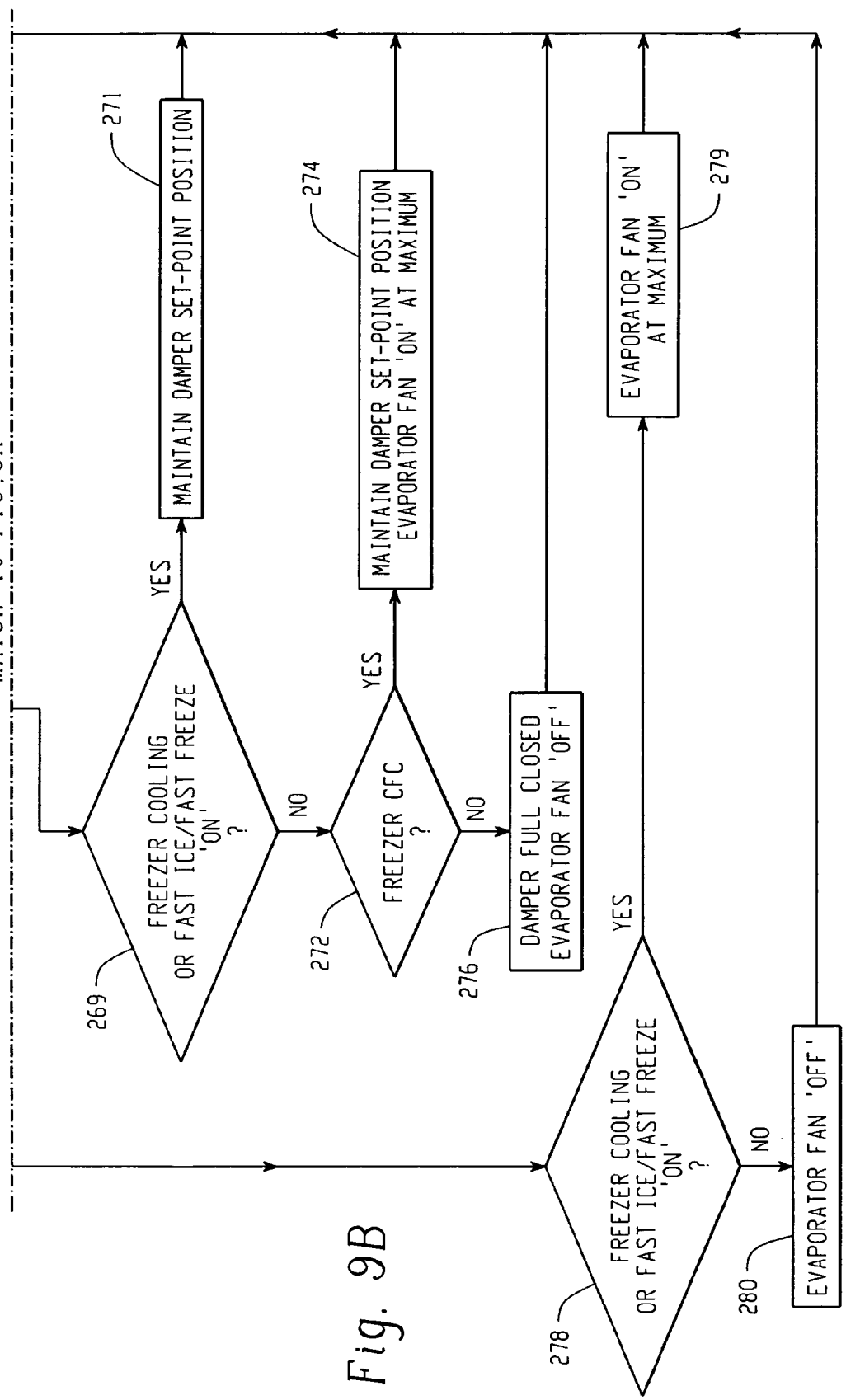

FIG. 8 shows an algorithm represented by a flowchart 200 that illustrates the operation of the refrigeration system utilizing the standard compressor 17 based on the freezer compartment temperature $T_F$. At step 202 the process determines if the freezer compartment temperature $T_F$ is greater than or equal to the freezer compartment upper temperature limit $T_{F-UTL}$. If YES, then at step 204 the standard compressor 17 and the condenser fan 22 will turn ON. Further, the variable speed evaporator fan 26 will turn ON at maximum speed. If NO, then at step 206 the process determines if the freezer compartment temperature $T_F$ is less than or equal to the freezer compartment lower temperature limit $T_{F-LTL}$. If NO, then the process jumps to step 220 where the standard compressor 17 and the condenser fan 22 are turned ON and the evaporator fan 26 will run at maximum speed. If YES, then at step 208 the process determines if there is a DEMAND FAN ON request and if the fresh-food compartment temperature $T_{FF}$ is greater than or equal to the fresh-food compartment upper temperature limit $T_{F-UTL}$. If YES, then at step 210 the standard compressor 17 and condenser fan 22 will turn ON. If NO, then at step 212 the standard compressor 17 and condenser fan 22 will turn OFF. The process proceeds to step 214 where it is determined if there is a DEMAND FAN ON request and if there is a call for cooling for the fresh-food compartment 14 or if the fast ice/fast freeze feature is activated. If YES, then at step 216 the evaporator fan will turn ON @ maximum speed. If NO, then at step 218 the evaporator fan 26 will turn OFF. The process repeats in order to maintain the proper temperatures in the freezer 12 and fresh-food 14 compartments.

Multiple negative temperature coefficient (NTC) thermistors comprising a fresh-food temperature sensor 56, a freezer temperature sensor 58 and an ambient temperature sensor 60 are provided for sensing the fresh-food compartment temperature $T_{FF}$, the freezer compartment temperature $T_F$ and the ambient temperature $T_A$ respectively. The main control board 42 receives electrical signals from the NTC thermistors 56, 58, 60 to process temperature information to thereby control the operation of the refrigeration and non-refrigeration components as described above. In the event that either the fresh-food temperature sensor 56 or the freezer temperature sensor 58 fails (e.g. opens or shorts) then no electrical signal will be sent from the temperature sensor 56, 58 to the main control board 42. In this situation the control system 40 will enter the fail safe mode as will be subsequently described.

In a refrigeration system with either a standard 17 or a variable speed 18 compressor if the fresh-food temperature sensor 56 fails the control system 40 will open and close the damper 28 at predetermined intervals to maintain the proper temperature level inside the fresh-food compartment 14. The damper open and close intervals are a function of the ambient temperature $T_A$ and both the fresh-food $T_{FF-SP}$ and freezer $T_{F-SP}$ compartment set-point temperatures. The interval for the damper open time is calculated by the following equation:

$$K12+K13*T_A-K14*T_{FF-SP}+K15*T_{F-SP} \quad (4)$$

where K12-K15 are predetermined variables. For example, in one embodiment K12=9.9; K13=0.25; K14=0.46 and K15=0.13. The interval for the damper closed time is calculated by the following equation:

$$K16-K17*T_A+K18*T_{FF-SP}-K19*T_{F-SP} \quad (5)$$

where K16-K19 are predetermined variables. For example, in one embodiment K16=75; K17=1.16; K18=1.37 and K19=0.25.

In refrigeration system with the variable speed compressor 18, if the freezer temperature sensor 58 fails the variable speed compressor 18 is cycled on and off using the calculated speed $\omega_{calc}$ at 100% duty cycle.

In a refrigeration system with the standard compressor 17, if the freezer temperature sensor 58 fails the standard compressor 17 will cycle on and off at predetermined intervals. The compressor on cycle is calculated by the following equation:

$$K20+K21*T_A-K22*T_{FF-SP}+K23*T_{F-SP} \quad (6)$$

where K20-K23 are predetermined variables. For example, in one embodiment K20=-2.41; K21=0.52; K22=0.26 and K23=0.75. The compressor closed cycle is calculated by the following equation:

$$K23-\text{the compressor on cycle} \quad (7)$$

where K23 is a predetermined variable. For example, in one embodiment K23=60.

The control system 40 further includes an adaptive defrost control device as disclosed in U.S. Pat. Nos. 6,694,755 and 6,837,060, both of which are assigned to the Applicant of the present application and both of which are herein incorporated by reference. An override function allows the control system 40 to override the adaptive defrost control device and switch the defrost function to a more conventional timer-based defrost method.

While specific embodiments of the invention have been described and illustrated, it is to be understood that these embodiments are provided by way of example only and that the invention is not to be construed as being limited thereto but only by proper scope of the following claims.

What is claimed is:

1. A refrigerator comprising:
a refrigeration system having refrigeration components including a compressor, a condenser, an evaporator and an evaporator fan; and, an electronic control system, the electronic control system comprising:
a first compressor speed control mode in which a calculated speed, ωcalc, is used to control a speed of the compressor when a freezer compartment temperature is below a freezer compartment upper temperature limit; and
a second compressor speed control mode in which an adjusted speed, ωadj, is used to control the speed of the compressor when a freezer compartment temperature is above the freezer compartment upper temperature limit, wherein the electronic control system calculates ωadj using an equation that includes ωcalc and, in addition to ωcalc, further includes the freezer compartment upper temperature limit;
wherein ωcalc is a polynomial equation,
wherein the polynomial equation, ωcalc comprises:

$(T_{F\text{-}SP})*(K1)+(T_{F\text{-}SP})^2*(K2)+(T_{FF\text{-}SP})*(K3)+(T_{FF\text{-}SP})^2*(K4)+(T_A)*(K5)+(T_A)^2*(K6)+(K7);$ wherein $T_{F\text{-}SP}$ is the freezer compartment set-point temperature, $T_{FF\text{-}SP}$ is a fresh food compartment set-point temperature, $T_A$ is an ambient temperature surrounding the refrigerator, and K1 to K7 are constant values.

2. A refrigerator comprising:
a refrigeration system having refrigeration components including a compressor, a condenser, an evaporator and an evaporator fan; and, an electronic control system, the electronic control system comprising:
a first compressor speed control mode in which a calculated speed, ωcalc, is used to control a speed of the compressor when a freezer compartment temperature is below a freezer compartment upper temperature limit; and
a second compressor speed control mode in which an adjusted speed, ωadj, is used to control the speed of the compressor when a freezer compartment temperature is above the freezer compartment upper temperature limit, wherein the electronic control system calculates ωadj using an equation that includes ωcalc and, in addition to ωcalc, further includes the freezer compartment upper temperature limit;
wherein ωcalc is a polynomial equation,
wherein the adjusted speed, ωadj comprises:

$\omega calc+\{T_F-(T_{F\text{-}UTL}+4+T_{F\text{-}SP})\}*K8;$ wherein $T_F$ is the freezer compartment temperature, $T_{F\text{-}UTL}$ is the freezer compartment upper temperature limit, $T_{F\text{-}SP}$ is the freezer compartment set-point temperature, and K8 is a constant value.

3. A refrigerator comprising:
a compartment;
a refrigeration system for cooling the compartment, the refrigeration system comprising a variable speed compressor;
an electronic control system for controlling the refrigeration system;
the electronic control system calculating a speed for the variable speed compressor using a polynomial equation comprising:

$\{(T_{F\text{-}SP})*(K1)+(T_{F\text{-}SP})^2*(K2)+T_{FF\text{-}SP})*(K3)+(T_{FF\text{-}SP})^2*(K4)+(T_A)*(K5)+(T_A)^2*(K6)+(K7)\}+\{T_F-(T_{F\text{-}UTL}+4+T_{F\text{-}SP})\}*K8;$ wherein $T_{F\text{-}SP}$ is a freezer compartment set-point temperature, $T_{FF\text{-}SP}$ is a fresh food compartment set-point temperature, $T_A$ is an ambient temperature surrounding the refrigerator, $T_F$ is a freezer compartment temperature, $T_{F\text{-}UTL}$ is a freezer compartment upper temperature limit, and K1 to K8 are constant values.

4. A refrigerator, comprising:
a freezer compartment;
a fresh-food compartment;
a variable speed compressor;
a freezer compartment temperature sensor that generates a freezer compartment temperature signal;
an electronic control system that receives the freezer compartment temperature signal and executes a compressor speed control algorithm that controls a speed of the variable speed compressor, wherein the compressor speed control algorithm includes calculating said speed of the variable speed compressor using a mathematical compressor speed equation, wherein the mathematical compressor speed equation includes a plurality of terms including a freezer compartment temperature, a freezer compartment set-point temperature, and a freezer compartment upper temperature limit,
a damper to regulate air flow between the freezer compartment and the fresh-food compartment;
a fresh-food compartment temperature sensor that generates a fresh-food compartment temperature signal; and
an ambient temperature sensor that generates an ambient temperature signal,
wherein the electronic control system receives the fresh-food compartment temperature signal and the ambient temperature signal and controls an operation of the damper, and
wherein when the fresh-food compartment temperature sensor fails, the electronic control system opens and closes the damper at calculated time intervals that are calculated using at least one mathematical equation that includes a further plurality of terms including an ambient temperature, the freezer compartment set-point temperature, and a fresh-food compartment set-point temperature.

5. The refrigerator of claim 4, wherein the variable speed compressor operates when the freezer compartment temperature is less than a freezer compartment lower temperature limit and the electronic control system controls the speed of the variable speed compressor, when the freezer compartment temperature is less than the freezer compartment lower temperature limit, using a different mathematical compressor speed equation comprising the freezer compartment temperature and the freezer compartment set-point temperature.

6. The refrigerator of claim 4, wherein the electronic control system includes a fail safe mode of operation in which the electronic control system closes the damper upon sensing that an evaporator fan is improperly not rotating or sensing that the evaporator fan is rotating improperly.

7. A refrigerator, comprising: a freezer compartment; a fresh-good compartment; a variable speed compressor; a freezer compartment temperature sensor that generates a freezer compartment temperature signal; and an electronic control system that receives the freezer compartment temperature signal and, when a freezer compartment temperature is less than a predetermined value, the electronic control system controls a speed of the variable speed compressor by calculating said speed using a first polynomial equation, and, when the freezer compartment temperature is greater than the predetermined value, the electronic control system controls the speed of the variable speed compressor by calculating said speed using a second polynomial equation that includes the first polynomial equation and additional parameters, a damper to regulate air flow between the freezer compartment and the fresh-food compartment;
a fresh-food compartment temperature sensor that generates a fresh-food compartment temperature signal; an ambient temperature sensor that generates an ambient temperature signal, wherein the electronic control system receives the fresh-food compartment temperature signal and the ambient temperature signal and controls an operation of the damper, wherein when the fresh-food compartment temperature sensor fails, the electronic control system opens and closes the damper at calculated time intervals that are calculated using at least one mathematical equation that includes a plurality of terms including an ambient temperature, a freezer compartment set-point temperature, and a fresh-food compartment set-point temperature.

8. The refrigerator of claim 7, wherein the second polynomial equation includes the freezer compartment temperature, the freezer compartment set-point temperature, and a freezer compartment upper temperature limit.

9. The refrigerator of claim 8, wherein the first polynomial equation includes the freezer compartment set-point temperature, the fresh-food compartment set-point temperature, and the ambient temperature.

10. The refrigerator of claim 7, wherein the variable speed compressor operates when the freezer compartment temperature is less than a freezer compartment lower temperature limit and the electronic control system controls the speed of the variable speed compressor, when the freezer compartment temperature is less than the freezer compartment lower temperature limit, using a third polynomial equation that is determined from the first polynomial equation.

11. The refrigerator of claim 7, wherein the electronic control system includes a fail safe mode of operation in which the electronic control system closes the damper upon sensing that an evaporator fan is improperly not rotating or sensing that the evaporator fan is rotating improperly.

* * * * *